UNITED STATES PATENT OFFICE.

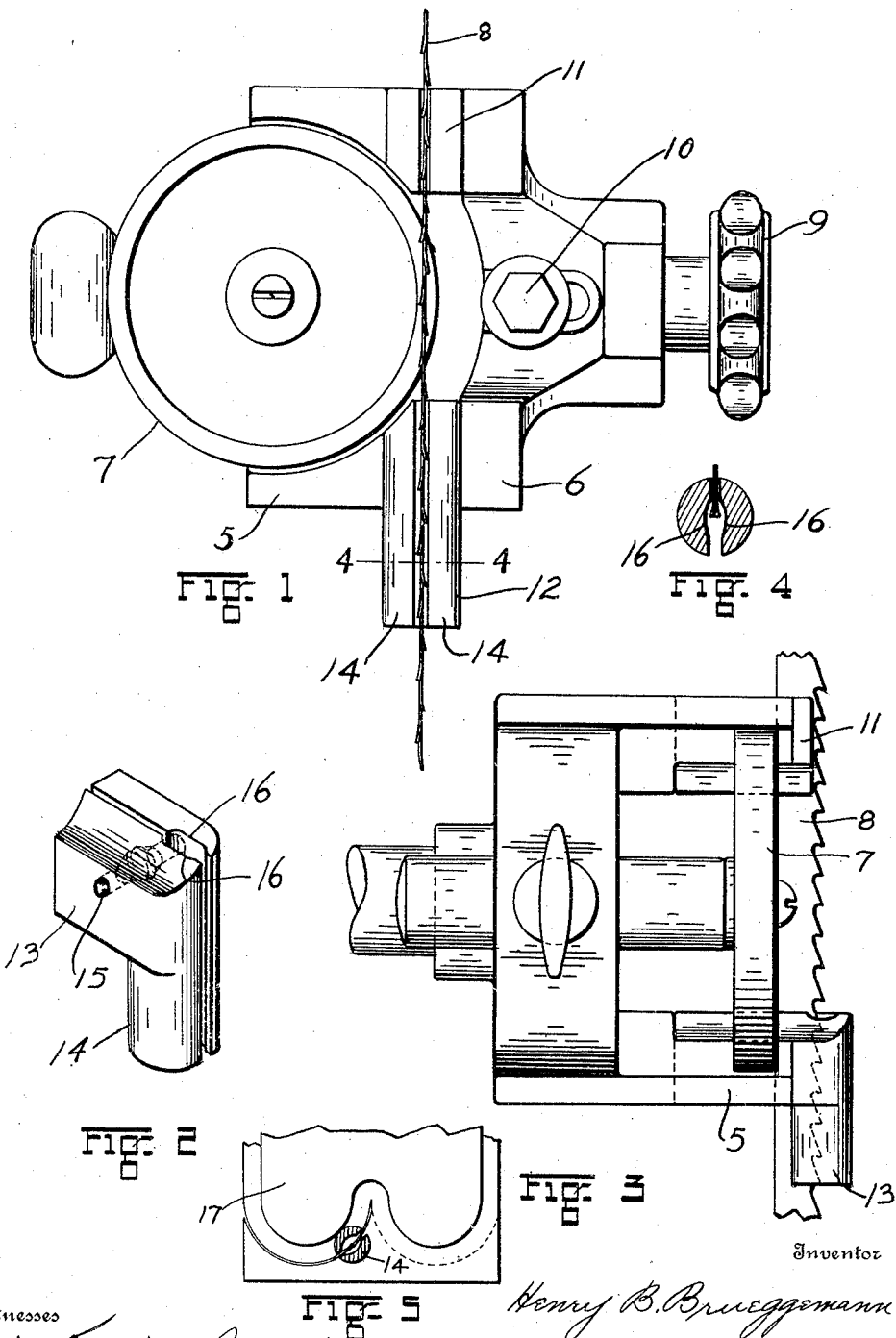

HENRY B. BRUEGGEMANN, OF CINCINNATI, OHIO.

GUIDE FOR BAND-SAWS.

964,846.

Specification of Letters Patent. Patented July 19, 1910.

Application filed December 8, 1909. Serial No. 531,944.

*To all whom it may concern:*

Be it known that I, HENRY B. BRUEGGEMANN, a citizen of the United States of America, and resident of Cincinnati, Hamilton county, State of Ohio, have invented certain new and useful Improvements in Guides for Band-Saws, of which the following is a specification.

This invention relates to saw guides, and particularly to guides for band saws.

An object of this invention is to produce a saw guide which will permit of cutting designs having acute angles, or sharp curves. This and other objects I attain in a device embodying the features herein described and illustrated.

In the drawings accompanying this application and forming a part thereof, Figure 1 is a front elevation of a guide head for a band saw, and is equipped with an embodiment of my invention. Fig. 2 is a perspective view of a saw guide, which forms an embodiment of my invention. Fig. 3 is a side elevation of the apparatus shown in Fig. 1. Fig. 4 is a section along the line 4—4 of Fig. 1. Fig. 5 is a plan view illustrating my invention in use.

The guide head illustrated in the drawings is adapted to be mounted on the frame portion of a band saw, and is formed in two parts, 5 and 6. The part 5 is provided with an adjustably mounted friction wheel 7, which guides the rear edge of a saw 8. The part 6 is secured to the part 5 and is capable of being adjusted laterally of the saw by means of a hand screw 9 and a tightening bolt 10. Saw guides, 11 and 12, are mounted on the upper and lower sides of the head and are adapted to prevent lateral motion of the saw. Each of the guides is formed in two pieces, one of which is secured to the part 5 and the other to the part 6.

Each piece of the guide 12 consists of a body 13 and a guide extension 14, which projects forwardly beyond the teeth of the saw 8 and downwardly along the saw. Each body 13 is secured to its respective mounting elements and when properly adjusted, the extensions 13 form a cylindrical envelop for the saw teeth, and the cutting edges of the teeth are located directly in the center of this cylinder.

The extension 14, by inclosing the saw teeth protects the operator, and at the same time forms a guide for a pattern 17 which is secured to the work, that is, to the piece to be cut by the saw. By providing the cylindrical extension and adjusting it so that the cutting edges of the teeth are located along its central axis, sharper angles and sharper curves may be cut with the aid of a pattern than with the ordinary guides.

One piece of each of the guides 11 and 12 is mounted upon the adjustable part 6 of the head, and, consequently, is adjustable relative to the saw. By providing the slots 16 in the extensions, the saw may deflect considerably during the cutting operations without damaging the saw teeth.

What I claim is:

1. A guide for band saws formed in separate halves and comprising a body and a cylindrical extension which surrounds the saw teeth and is provided with an enlarged recess, through the center of which and along the central axis of said extension the teeth of the saw travel.

2. In combination with the permanently and adjustably mounted parts of a guide head for band saws, a guide comprising a body, and a cylindrical extension which surrounds the saw teeth and along the central axis of which the cutting edges of the teeth travel, said guide being formed in separate halves, one of which is mounted on each of the parts of the guide head.

3. A guide for band saws comprising a body and a cylindrical extension, which is provided with an enlarged recess, along the axis of which the saw is adapted to travel.

HENRY B. BRUEGGEMANN.

Witnesses:
WALTER F. MURRAY,
W. THORNTON BOGERT.